UNITED STATES PATENT OFFICE.

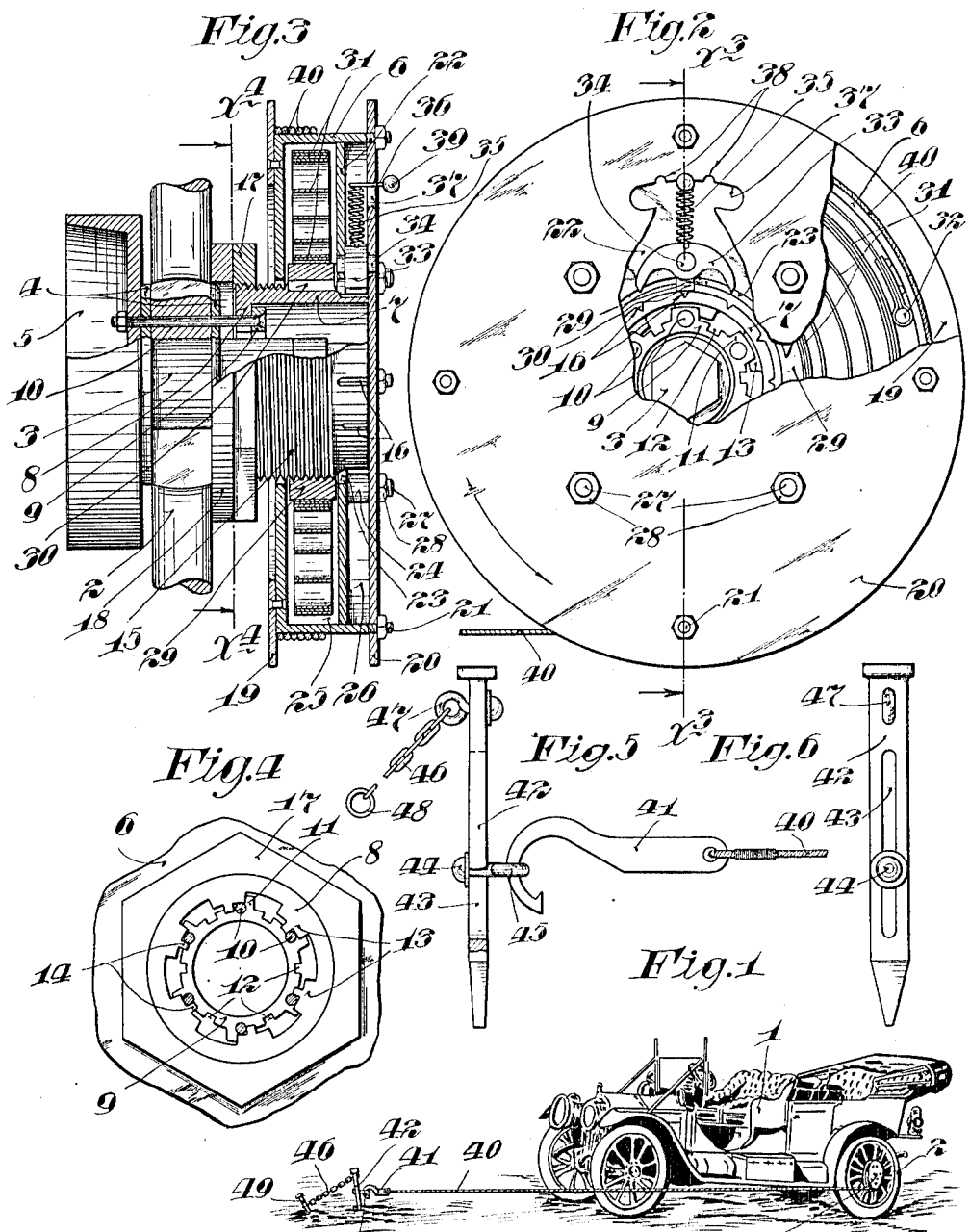

LEONARD O. PILLSBURY, OF CROCKER, SOUTH DAKOTA.

EMERGENCY-WINDLASS FOR AUTOMOBILES.

1,080,653.  Specification of Letters Patent.  Patented Dec. 9, 1913.

Application filed May 3, 1912. Serial No. 694,839.

*To all whom it may concern:*

Be it known that I, LEONARD O. PILLSBURY, a citizen of the United States, residing at Crocker, in the county of Clark and State of South Dakota, have invented certain new and useful Improvements in Emergency-Windlasses for Automobiles; and I do hereby declare the following to be a full, clear, and exact description of the invention, such as will enable others skilled in the art to which it appertains to make and use the same.

My invention has for its object to provide a simple and efficient windlass attachment for automobiles adapted for use when the machine is stuck in mud, sand, or snow, to enable the machine to pull itself out and onto the road bed over which it may be propelled in the customary manner.

To the above ends, the invention consists of the novel devices and combinations of devices hereinafter described and defined in the claims.

In the accompanying drawings, which illustrate the invention, like characters indicate like parts throughout the several views.

Referring to the drawings, Figure 1 is a perspective view of an automobile, having applied thereto, my improved emergency windlass; Fig. 2 is a view in outside elevation of the improved emergency windlass applied to the hub of an automobile wheel, with some parts broken away; Fig. 3 is a view in transverse section taken on the line $x^3$ $x^3$ of Fig. 2; Fig. 4 is a detail view partly in side elevation and partly in section taken on the line $x^4$ $x^4$ of Fig. 3, showing the means for detachably locking the improved emergency windlass on the hub of an automobile; Fig. 5 is a detail view in side elevation of the cable anchoring means with some parts broken away and with some of the exposed parts shown in section; and Fig. 6 is a view in rear elevation of the parts shown in Fig. 5 with some parts removed.

The numeral 1 indicates the body of an automobile and the numeral 2 indicates, as an entirety with the exception of the hub, one of the rear or traction wheels thereof. Said hub is indicated by the numeral 3 and has integrally formed therewith a pair of laterally projecting annular flanges 4. These flanges 4 are spaced apart, one from the other, between which flanges the inner ends of the spokes of the wheel 2 project and to which they are secured. The customary brake drum 5, in the form of a flanged disk, is rigidly secured to the inner flange 4 of the wheel 2.

The numeral 6 indicates the windlass drum, which is loosely and rotatively mounted on a tubular, horizontally extended hub 7 that is loosely telescoped over the outer projecting end portion of the hub 3. For detachably securing the hub 7 to the traction wheel 2, I provide the hub with an annular clutch flange 8 having interlocking engagement with a clutch ring 9 carried by the traction wheel 2. The clutch ring 9 is loosely telescoped over the outer end portion of the hub 3 and is rigidly secured to the wheel 2 and held spaced outward therefrom, by means of a plurality of comparatively long nut equipped bolts 10. The heads of these bolts 10 are counter sunk in the outer face of the clutch ring 9 and their inner, or nut equipped ends, extend through both flanges 4 of the hub 3, through the ends of the spokes of the wheel 2, and through the body portion of the brake drum 5.

On the periphery of the clutch ring 9, is formed a plurality of outwardly extended and circumferentially spaced retaining lugs 11. Notches 12 are formed in the periphery of the clutch ring 9 and are located, one intermediately between each pair of retaining lugs 11. The clutch flange 8 is integrally formed on the inner end portion of the hub 7 and projects inwardly and laterally therefrom. On the inner or free edge of the flange 8, is formed a multiplicity of inwardly projecting and spaced retaining lugs 13, each equipped at its intermediate portion with an inwardly projecting stop pin 14. These lugs 13 and stop pins 14 are adapted to be passed, respectively, between the retaining lugs 11 and through the notches 12 by an endwise movement of the hub 7. Then by giving the hub 7 a slight rotary movement, the lugs 13 are brought into interlocking engagement with the lugs 11 and the stop pins 14 are brought into engagement with the clutch ring 9 and bolts 10, as best shown in Fig. 4. By the interlocking engagement of the lugs 11 and 13, the hub 7 is held against endwise separation from the wheel 2 and by the engagement of the stop pins 14 with the bolts 10, the rotary movement of the hub 7, with respect to the hub 3, is limited. After the stop pins 14 are passed through the notches 12, they are turned into engagement with either of the bolts 10, at their left or right, depending on which side of the machine the windlass drum is applied.

The bolts 10 and stop pins 14 are of equal number and the bolts 10 are circumferentially spaced about the axis of the hub 3 and are radially located therefrom, a distance sufficient to permit the inner edges of the lugs 13 to be rotated into engagement therewith, thereby holding the hub 7 against lateral movement with respect to the wheel 2. External screw threads 15 are cut on the hub 7 and extend from the inner end thereof, toward the outer end of the hub, a distance equal to about two-thirds the full length of said hub. Cut on the outer end portion of the hub 7, adjacent to the screw threads 15, is a multiplicity of circumferentially spaced and transversely extended V-shaped lock notches 16, the purpose of which will presently appear.

For frictionally clamping the retaining lugs 13 into engagement with the retaining lugs 11, to prevent rotation of the hub 7 in respect to the wheel 2, a large hexagon nut 17 having internal screw threaded engagement with the screw threads 15, is mounted on the inner end of the hub 7 which projects outside of the drum 6. A thrust ring 18 is telescoped over the outer flange 4 of the hub 3 and rests on the spoke of the wheel 2 as a base of resistance. This ring 18 is of substantially the same size as the nut 17 and acts as a base of resistance therefor. By turning the nut 17 into engagement with the thrust ring 18, the hub 7 will be forced endwise away from the wheel 2 and the retaining lugs 13 forced into frictional engagement with the retaining lugs 11.

Rigidly secured to the inner or fixed head of the windlass drum 6, by rivets or otherwise, is a flat ring 19 of considerably larger diameter than the windlass drum 6 and projects therebeyond, to form one of a pair of cable guiding flanges. A flat cover or outer drum head 20 is detachably secured to the open end of the drum 6 by means of nut equipped studs 21 which project from the outer edge of the windlass drum 6 through openings formed in the cover 20. The cover 20 is of substantially the same diameter as the flange 19 and its projecting edge portion forms the other cable guiding flange of the windlass drum 6.

Secured to the drum head 20 and carried thereby, is a disk like partition plate 22 which closely fits within the drum 6 and is provided with an axial opening 23 through which the hub 7 projects. Spacing lugs 24 integrally formed on the partition plate 22, engage the face of the drum head 20 and hold the said partition plate spaced therefrom, thereby dividing the windlass drum 6 into an inner compartment 25 and an outer compartment 26. At their outer ends, the spaced lugs 24 terminate in reduced ends or studs 27 that project through the drum head 20. Nuts 28 have screw threaded engagement with the studs 27 and draw the spacing lugs 24 into engagement with the drum head 20.

Located within the inner compartment 25, is a supplemental hub section 29 in the form of an internally threaded ring screwed onto the screw threaded section of the hub 7 and held against rotation thereon by a key 30. Also located within the compartment 25, is a spiral spring 31 secured, at its outer end, to the drum 6 by means of an anchoring pin 32 and loosely coiled, at its inner end, around the supplemental hub 29, the purpose of which will presently appear.

For coöperation with the lock grooves 16, to lock the windlass drum 6 with the hub 7 and to rotate therewith in a predetermined direction, but to slip thereon in a reverse direction, is provided a double ended and reversely acting lock dog 33 mounted in the compartment 26. Integrally formed on the sides of the dog 33, is a pair of reversely projecting trunnions 34 rotatively mounted in alined openings cut or punched, one in the drum head 20, and the other in the partition plate 22. For holding the lock dog in engagement with any one of the lock grooves 16 to cause the windlass drum 6 to rotate in either direction, at will, a thrust spring 35 is secured to the intermediate portion of the dog 33 and extends therefrom, at right angles to the trunnions 34. The outer end of the thrust spring 35 terminates in a laterally projecting arm 36 that projects through and works within a segmental slot 37 cut in the drum head 20. In the farthest inner edge of the slot 37, from the dog 33, is formed a pair of spaced lock notches 38 into either one of which, the arm 36 may be yieldingly held by the spring 35, for the purpose of holding either end of the dog 33 engaged with one of the lock grooves 16, depending on which one of the traction wheels 2 the windlass drum 6 is attached. In Fig. 2, the lock dog 33 is shown as held by the thrust arm 35 in an inoperative or intermediate position. A finger piece 39 is secured to the outwardly projecting end of the arm 36.

A cable 40 is attached, at one end, to the windlass drum 6 and is adapted to be wound thereon, or partly thereon, under the action of the spring 33. On the outer or free end of the cable 40, is secured an anchoring hook 41. This hook 41 may be secured to any suitable anchorage at a distant point from the stalled machine. But I preferably employ an anchorage in the form of a headed stake 42 adapted to be driven into the ground and provided with a vertically extended slot 43. Slidably mounted in the slot 43 and swiveled to the stake 42, is a headed stud 44 terminating in an eye 45, through which the hook 41 is adapted to be inserted. Aside from anchoring the stake 42 by driving the same into the ground, I attach to the upper end thereof, a short chain 46 by means of a swiveled eye 47. On the outer end of the chain 46 is a ring 48 through which is driven into the ground, a pin 49.

When the automobile becomes stuck in the sand, mud, snow, or any soft road bed, the windlass drum 6 is attached to one of the traction wheels 2 to which is secured the clutch ring 9 in a manner previously described. The stake 42 is then anchored at a distant point from the automobile. After the stake has been properly anchored, the extended or hook equipped end of the cable 40 is drawn forward unwinding the cable from the under side of the drum 6, as shown in Figs. 1 and 2 and the hook 41 is secured to the eye 45 on the stake 42. In actual usage, the anchoring eye 45 will be kept as near as possible to the ground in order to put as little strain upon the anchorage as possible.

During the unwinding of the cable 40 from the drum 6, the spring 31 is wound upon the supplemental hub 29. In some instances, when it is necessary to use a long cable, the winding of the spring 31 will be completed before the cable 40 is unwound, the necessary length, from the windlass drum 6, in which case, the inner end of the spring 31 will slip on the supplemental hub 29. After the cable 41 has been properly anchored, the left hand end of the dog 33, with respect to Fig. 2, will be moved into engagement with one of the lock grooves 16. The traction wheels are then driven by the engine and the cable wound on the windlass drum 6, thereby causing the stuck machine to positively move forward as the cable is wound upon the windlass drum 6.

By this simple device, an automobile may be easily made to draw itself out of the worst kind of sink holes, sand, mud, ruts, or snow. This device, therefore, not only saves time and frequent embarrassment, but saves expense which is very often caused by the hire of a team or another automobile for pulling the stalled machine onto a solid road bed.

What I claim is:

1. The combination with an automobile wheel, of a windlass drum hub secured to said wheel, a windlass drum loosely journaled on said hub, a cable secured to said drum and adapted to be anchored at a distant point, means for causing said drum to rotate with its hub during the winding of said cable thereon, but permitting rotation of the drum on its hub during the unwinding of said cable, and a spiral spring loosely coiled about said hub, at its inner end, and anchored at its outer end to said drum, said spring tending to rotate the drum on its hub, in advance of the speed at which it is being rotated by said hub, to take up the slack in the cable, but permitting said drum to be rotated on its hub during the unwinding of the cable, substantially as described.

2. The combination with an automobile wheel, of a clutch ring secured to said wheel, a hub equipped windlass drum, said hub having detachable interlocking engagement with said clutch ring, and a set nut having threaded engagement with the hub of said windlass drum and engageable with said wheel, as a base of resistance, to frictionally clamp the opposing faces of said hub and clutch ring together, substantially as described.

3. The combination with an automobile wheel, of a clutch ring having retaining lugs, bolts adjustably and detachably securing said clutch ring to said wheel, a hub equipped windlass drum, said hub having retaining lugs for detachable interlocking engagement with the lock lugs of said clutch ring, and stop pins on said hub engageable with said bolts to limit the rotary movement of said hub with respect to said wheel.

4. The combination with an automobile wheel, of a clutch ring having retaining lugs, bolts adjustably and detachably securing said clutch ring to said wheel, a hub equipped windlass drum, retaining lugs on said hub for detachable interlocking engagement with the lock lugs of said clutch ring, stop pins on said hub engageable with said bolts to limit the rotary movement of said hub with respect to said wheel, a set nut having threaded engagement with the hub of said windlass drum and engageable with said wheel, as a base of resistance, to frictionally clamp the opposing faces of said retaining lugs and said clutch ring together, substantially as described.

5. The combination with an automobile wheel, of a clutch ring having retaining lugs, bolts adjustably and detachably securing said clutch ring to said wheel, a thrust ring on said wheel, a hub equipped windlass drum, retaining lugs on said hub, for detachable interlocking engagement with the lock lugs of said clutch ring, stop pins on said hub engageable with said bolts to limit the rotary movement of said hub with respect to said wheel, a set nut having screw threaded engagement with the hub of said windlass drum and engageable with said thrust ring, as a base of resistance, to frictionally clamp the opposing faces of said retaining lugs and said clutch ring together, substantially as described.

6. The combination with an automobile wheel, of a clutch ring having retaining lugs, secured to said wheel, a thrust ring on said wheel, a windlass drum having retaining lugs for detachable interlocking engagement with the lock lugs of said clutch ring, means for locking said windlass drum to said wheel against rotation with respect thereto, a set nut having screw threaded engagement with the hub of said windlass drum and engageable with said thrust ring, as a base of resistance, to frictionally clamp the opposing faces of said retaining lugs and said clutch ring together, substantially as described.

7. The combination with an automobile wheel, of a windlass drum hub secured to said wheel, a windlass drum loosely journaled on said hub, one of the heads of said drum being removably mounted, a supplemental head secured to said removably mounted head but spaced apart therefrom, to divide said drum into inner and outer compartments, said hub having a circumferentially enlarged section working in said inner compartment and holding said windlass drum against lateral movement on said hub, a spiral spring mounted on said hub extension and anchored to said windlass drum, and a reversely acting lock dog arranged to lock said drum to its hub in either direction of rotation, at will, but permitting rotation thereof in a reverse direction, substantially as described.

In testimony whereof I affix my signature in presence of two witnesses.

LEONARD O. PILLSBURY.

Witnesses:
Mrs. A. E. CARLTON,
A. E. CARLTON.

Copies of this patent may be obtained for five cents each, by addressing the "Commissioner of Patents, Washington, D. C."